May 23, 1933. B. D. MICKEY ET AL 1,911,029

PARALLEL OPERATION OF DIRECT CURRENT GENERATORS

Filed Sept. 14, 1931

Inventors:
Bruce D. Mickey,
Laurence D. Jones,
by Charles E. Mullen
Their Attorney.

Patented May 23, 1933

1,911,029

UNITED STATES PATENT OFFICE

BRUCE D. MICKEY AND LAURENCE D. JONES, OF SCHENECTADY, NEW YORK, ASSIGNORS TO GENERAL ELECTRIC COMPANY, A CORPORATION OF NEW YORK

PARALLEL OPERATION OF DIRECT CURRENT GENERATORS

Application filed September 14, 1931. Serial No. 562,712.

Our invention relates to electrical systems of distribution and more particularly to the parallel operation of direct current generators and has for an object the provision of such a system, which in a simple and efficient manner, insures the proper load division between the generators.

Heretofore, to insure an equal division of the load, direct current generators of similar operating characteristics have been operated in parallel by the provision of equalizer connections. However, when it was desired to operate the parallel connected generators over a wide range in voltage, which is the service commonly met with in Ward Leonard operation of reversing rolling mill motors or elevators, and the like, the use of the equalizer connections complicated the control system.

In accordance with our invention in one form thereof, we provide for varying the relative excitation of parallel connected generators so that the load is proportionately divided between the generators under all operating conditions. More specifically, we provide an auxiliary generator responsive to the division of the load between the generators for modifying their excitation to insure a proportionate division of the load.

An important feature of our invention is that the voltage of the auxiliary generator is always of correct polarity and magnitude to cause the proportionate division of the load between the generators irrespective of their voltage or of the fractional load which may be carried by each generator.

Figure 1:
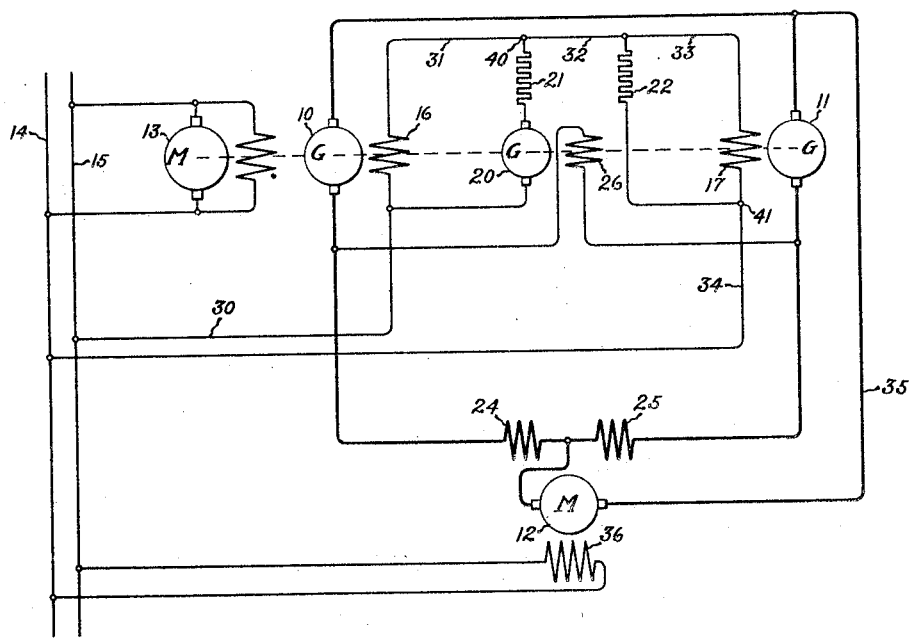
Figure 2:
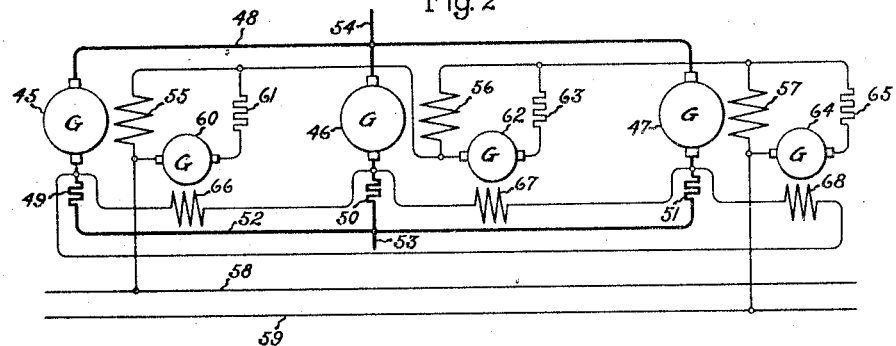

For a more complete understanding of our invention, reference should now be had to the drawing, Fig. 1 of which shows diagrammatically our invention as applied to a pair of generators supplying current to a motor and Fig. 2 illustrates our invention applied to a plurality of generators.

Referring to the drawings, we have shown our invention in one form as applied to two generators 10 and 11 of similar operating characteristics and equal capacity connected in parallel to supply current to a motor 12. As shown, the generators 10 and 11 are driven by means of a shunt connected motor 13 energized from a suitable source of direct current supply as indicated by the supply lines 14 and 15, but it will, of course, be understood that any suitable prime mover may be used for this purpose. The separately excited field windings 16 and 17, respectively, provided on the generators 10 and 11 are connected in series to the supply lines 14 and 15.

To control the division of load an auxiliary generator 20 mounted on the same shaft with the generators 10 and 11, is connected through a resistance 21 in shunt with the field winding 16. Preferably, a resistance 22 is similarly connected across the field winding 17. There is provided in series with the armature of the generator 10, a line resistance 24, and similarly in series with the armature of generator 11 is a line resistance 25. As shown the commutating and compensating windings of the motor are used for the line resistances. A field winding 26 provided on the auxiliary generator 20 is connected across these resistances so that the auxiliary generator is energized in accordance with the difference in potential drop across the resistances 24 and 25.

With the above understanding of the elements and their organization with respect to each other in the system, the operation of the system itself and the effect of the exciter 20 and the resistances 21, 22, 24 and 25 upon the division of the load between the generators, will be readily understood from the description which follows:

In the operation of our invention it will be assumed that the motor 13 is driving the generators 10 and 11 and the auxiliary generator 20 at substantially constant speed and that the field windings 16 and 17 are energized from the supply lines 14 and 15 through a circuit which may be traced from the supply line 15, conductor 30, field winding 16, conductors 31, 32 and 33, field winding 17, and by conductor 34 to the other supply line 14. The generators 10 and 11 thereupon produce a voltage which causes a current to flow from one side of each armature through their respective resistances 24 and 25, through the armature of the motor 12 and thence by a common return bus 35 to the other side of the armatures. The motor 12 is provided with a field winding 36 which is energized from the supply lines 14 and 15. Inasmuch as the capacities of the generators are equal if it is assumed that the generator 10 is carrying more of the load than the generator 11, it is, of course, elementary that the current supplied from the generator 10 is larger than that supplied by the generator 11. Consequently, there is a greater voltage drop across the resistance 24 than there is across the resistance 25, and inasmuch as the field winding 26 of the auxiliary generator 20 is connected across these resistances, its excitation will be proportional to this difference in voltage. The generator 20 thereupon generates a voltage in a direction to reduce the excitation of the generator 10. The excitation current supplied to the field winding 17 increases slightly, inasmuch as the voltage between the points 40 and 41 on either side of the field winding 17 is slightly increased by the voltage produced by the exciter 20. The reduction of the excitation of the generator 10 causes it to decrease the load which it carries and, likewise, the increase in excitation of the field 17 of the generator 11 causes it to assume a greater proportion of the load. As soon as the load divides in equal proportion the potential drop across the resistances 24 and 25 become equal, and the exciter no longer functions to produce a corrective voltage.

Assuming now that the generator 11 is carrying a greater portion of the load, it follows that the difference in potential across the resistance 25 is greater than the difference in potential across resistance 24. The result is that a current flows through the field winding 26 of the auxiliary generator in a direction opposite from the condition assumed above, and consequently the auxiliary generator 20 produces a voltage in the opposite direction which voltage tends to increase the excitation of the field winding 16. This increased excitation as before causes the generator 10 to increase the load which it is carrying.

If the capacities of the two machines are unequal, it will of course be understood that the relative values of the resistances 21, 22, 24 and 25 will be proportioned so that each generator will carry its correct share of the load. If the generator 11 is of less capacity, the resistance 22 is proportionately reduced to bypass around its field winding a greater proportion of the field current, and the resistance 25 is increased so that when both generators are operating at full load the voltages across the resistances 24 and 25 are equal.

Referring now to Fig. 2 we have shown our invention as applied to a plurality of generators 45, 46 and 47 one side of their respective armatures being connected by means of a conductor 48; the other side of each armature being connected through their respective series resistances 49, 50 and 51 to a common conductor 52. Power may be supplied to a suitable load by conductors 53 and 54. A separate source of excitation is provided for each generator by field windings 55, 56 and 57 connected in series to a suitable source of direct current supply as indicated by the supply line 58 and 59. An auxiliary generator 60 is connected through a resistance across the field winding 55 of the generator 45; similarly an auxiliary generator 62 and a resistance 63 are connected across the field winding 56, and an auxiliary generator 64 and resistance 65 are connected across the field winding 57. Excitation is provided for the auxiliary generators 60, 62 and 64 by field windings 66, 67 and 68 each of which windings is responsively connected to the potential drop across a pair of the resistances in series with each of the armatures.

Assuming that the armatures of all the generators are being driven at constant speed as by synchronous motors or by single prime mover, it will be observed that if the generator 45 carries more than its proportionate share of the load, the potential drop across the resistance 49 will be increased above the potential drop across the resistance 50 and the resultant excitation of the auxiliary generator 60 will thereby decrease the excitation of the generator 45 causing the load carried by the generator to diminish.

If the generator 47 should carry more than its proportionate share of the load, the potential drop across the resistance 51 would exceed the potential drop across the resistance 49 and the consequent excitation produced on the auxiliary generator 64 by its field winding 68 would cause a decrease in the excitation of the field winding 57 on the generator 47.

If each of the generators are of equal capacity then the resistances 61, 63 and 65 may be equal. Likewise the resistances 49, 50 and 51 may have the same value. However, if one of the generators has a greater capacity than the other, it will of course now be apparent to those skilled in the art that the resistance values are proportionately changed so that the generator of less capacity will never carry more than its proportionate share of the load.

While we have shown a particular embodiment of our invention, it is understood, of course, that we do not wish to be limited thereto, since many modifications may be made, and we therefore contemplate by the appended claims to cover any such modifications as fall within the true spirit and scope of our invention.

What we claim as new and desire to secure by Letters Patent in the United States is:

1. In a system of distribution the combination with a pair of parallel connected direct current generators arranged to supply current to a load, means for exciting said generators, a single auxiliary generator for modifying the excitation of both of said generators and means responsive to any departure from a predetermined load division between said generators for exciting said auxiliary generator to cause a part of the load carried by one generator to be shifted to the other generator.

2. A Ward-Leonard control system comprising a motor, a pair of parallel connected load generators connected in local circuit with said motor, separately excited field windings for each of said generators, connections for connecting said field windings in series circuit relation, a separately excited field winding for said motor, an auxiliary generator, a resistance, connections for connecting said auxiliary generator and said resistance across a field winding of one of said generators, a second resistance connected in shunt with a field winding on said other generator and means responsive to any departure from a predetermined load division between said generators for exciting said auxiliary generator thereby shifting a part of the load from one generator to the other generator to maintain a constant proportion of the load on each of said generators.

3. A Ward-Leonard control system comprising a motor means, a plurality of parallel connected load generators connected in local circuit with said motor means, separately excited field windings provided for each of said generators connected in series with each other, an auxiliary generator and a resistance for each generator, connections for connecting said auxiliary generators and said resistances in sunt with a field winding of each of said generators, and means responsive to a departure from a predetermined load division between said generators for exciting said auxiliary generators to shift a part of the load from one generator to another of said generators.

4. Means for maintaining equal load division between a pair of mechanically connected generators connected in parallel to supply power to a common load, comprising series connected separately excited generator field windings, a single auxiliary generator having an armature and a field winding energized in response to differences in load current supplied by said generators, connections for connecting the armature of said auxiliary generator in shunt circuit relation with one generator field winding, a resistance connected in series with said armature for restricting the normal current by-passed around said generator field windings by said shunt circuit, a second resistance equal in value to said first-mentioned resistance connected in shunt circuit relation with said other generator field winding to balance said field circuits electrically and to insure the same excitation of said field windings under balanced load conditions.

5. In combination with a variable voltage drive having a pair of mechanically connected generators connected in parallel to supply power to a motor, of means for maintaining equal load division between said generators comprising a field winding for each of said generators, connections for connecting said windings in series relation from a separate source of excitation, an auxiliary generator having an armature and a field winding excited in response to differences in load currents supplied by said generators to said motor, a resistance connected in series with said armature and connections for connecting said armature and said resistance in shunt circuit relation with .one of said generator field windings, the said resistance restricting the normal current by-passed through said shunt circuit to insure the excitation of said generator field winding, and a second resistance equal in value to said first-mentioned resistance connected in shunt circuit relation with said other generator field winding to balance said field circuits electrically and to insure the same excitation of said field windings under balanced load conditions.

In witness whereof we have hereunto set our hands.

BRUCE D. MICKEY.
LAURENCE D. JONES.